3,319,742
TORQUE ACTUATED BRAKE SYSTEM
James C. Cumming, Pleasant Ridge, Mich., assignor to Rockwell-Standard Corporation, Pittsburgh, Pa., a corporation of Delaware
Filed Apr. 7, 1965, Ser. No. 446,281
3 Claims. (Cl. 188—152)

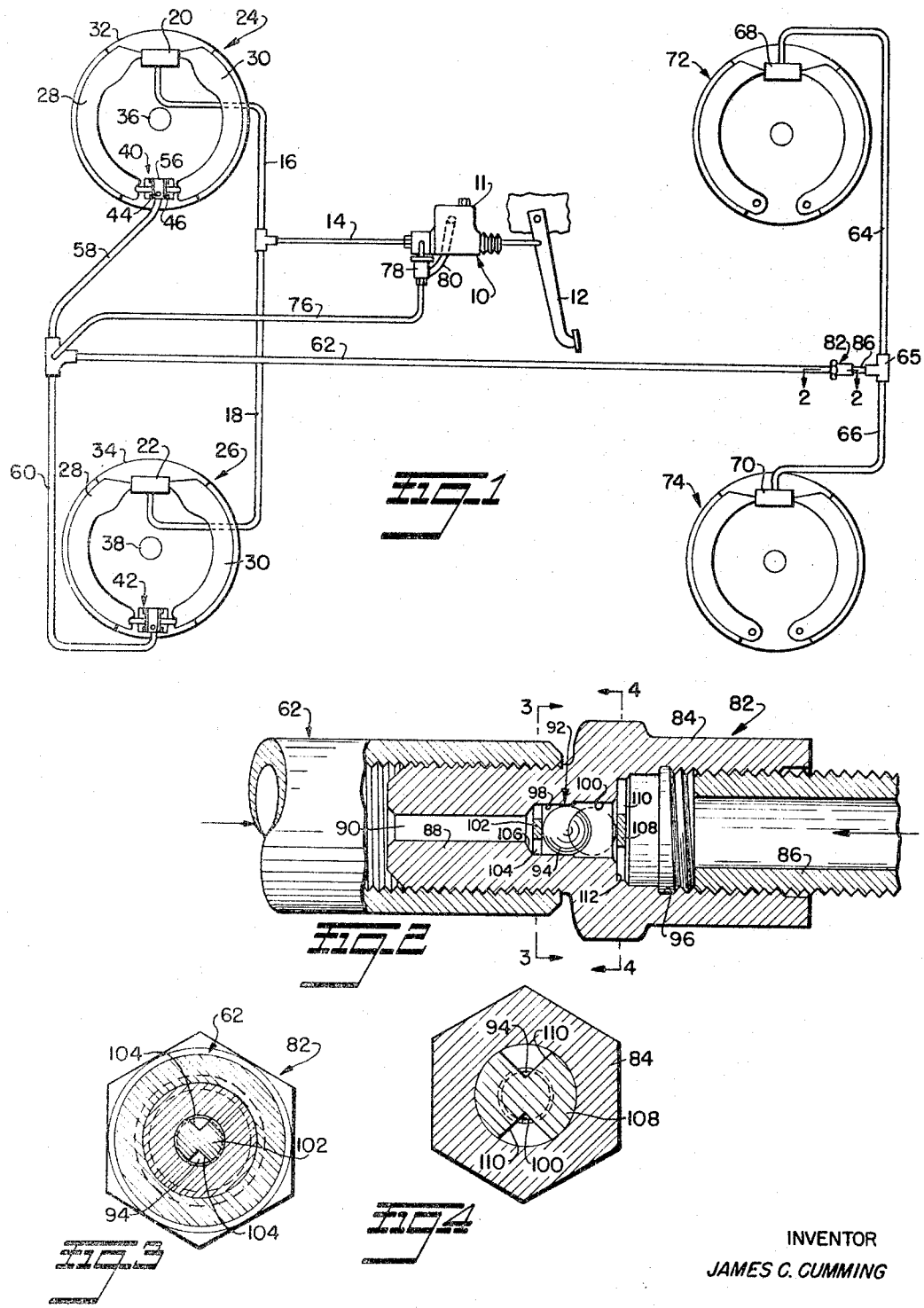

The present invention refers to hydraulic brake systems for motor vehicles and more particularly to brake systems in which certain brakes are applied solely by the torque reaction forces derived from one or more of the other brakes.

Hydraulic brake systems of this type are disclosed in U.S. Patent 3,256,962.

In these systems only the brakes at the axle having the lightest braking load are directly connected to the master cylinder. These brakes may be called the primary brakes. The remaining brakes of the vehicle are included in a secondary system which is pressurized by the torque reaction derived from the primary brakes. The torque members in the primary brakes rotate slightly with the brake drum upon contact therewith thereby compressing the fluid in the associated power cylinder and thus causing instant actuation of the brakes in the secondary system.

In such systems, when the brakes of the primary system are actuated by pressure from the master cylinder the brake shoes are spaced apart at the wheel cylinder end into contact with the rotating brake drum. The other ends of the brake shoes are anchored against a fluid column in a compression power cylinder which is part of the secondary system including the wheel cylinders of the brakes in the secondary system so that when the brake shoes of the primary brakes frictionally contact the brake drum they will be forced to rotate with the drum for a short distance and thus exert pressure on the column of fluid in the power cylinder which is transferred into the wheel cylinders of the secondary brakes for brake application which is substantially intantaneous with the application of the primary brakes. Thus far, operation of the system is correct and free from any side effects. In such brake systems undesirable pressure variations occasionally develop in the secondary system. More specifically, it has been found that when the vehicle stops with the brake shoes of the primary brakes solidly seated against the drum, a slight rocking of the shoes occurs which causes a loss of pressure in the secondary system, very similar to a surging action, which is uncomfortably felt as uncontrolled brake actuation. This effect is especially pronounced in vehicles having a soft suspension since the spring wind-up during braking seems to enhance rocking of the brake shoes in the primary brakes and momentary pressure drops down to zero in the secondary system have been measured during tests. Although this pressure drop in the secondary system after initial brake application is of very short duration it is undesirable because of the uncontrolled braking effect.

Furthermore, it was found to be desirable to provide means for controlling the fluid flow in the secondary system by which the flow of fluid would be established in the brake applying direction at one rate and in the brake release direction at a slightly different rate so that when the vehicle stops, the brakes in the secondary system will only very slowly be released due to the pressure drop.

Accordingly, the present invention has a main object the provision of means in the secondary system of a torque reaction force actuated power braking system which prevents or considerably reduces instantaneous pressure loss in the secondary system after initial brake application.

Another object is the provision of novel valve means in the secondary system of a torque reaction force actuated power braking system which allows restricted movement of fluid in one direction at one rate and restricted movement of fluid in the other direction at a different rate.

Other objects and novel features will become apparent from the following description in connection with the appended drawings in which:

FIGURE 1 schematically illustrates one representative form of a torque reaction force actuated power braking system according to the present invention embodying the novel fluid control means;

FIGURE 2 is a longitudinal section through the present novel valve means;

FIGURE 3 is a transverse cross section through the valve of FIGURE 2 along line 3—3; and FIGURE 4 is another transverse cross section through the valve of FIGURE 2 along line 4—4 thereof.

With reference to FIGURE 1 the schematic view represents a novel vehicle power braking system of a type more fully disclosed in the aforesaid U.S. Patent 3,256,962 to which reference may be made. The system comprises a master cylinder 10 connected for actuation by a brake pedal 12. A conduit 14 and branches 16 and 18 connects brakes 24 and 26, respectively, with the master cylinder 10. This forms the primary system and will be referred to as such hereafter. Brakes 24 and 26 may be the front wheel or rear wheel brakes of a vehicle depending on which axle has the lightest braking load.

The brakes 24 and 26 are identical and comprise each a pair of opposed brake shoes 28 and 30 adapted to be brought into contact with their associated brake drums indicated at 32 and 34, respectively, which may be secured to and rotate with the wheel spindles or axles 36 and 38.

The wheel cylinders 20 and 22 of the primary brakes 24 and 26 are positioned between the ends of the brake shoes at one end as is customary and the other ends of the brake shoes are anchored hydraulically at compression or power cylinders 40 or 42, respectively. These cylinders are identical and may contain each a pair of opposed pistons 44 and 46, which are suitably anchored against outward movement and which rockably engage the ends of the brake shoes 28 and 30. Power cylinders 40 and 42 each comprise a compression chamber 56 between the pistons 44 and 46 in communication with branch conduits 58 and 60, respectively, of the secondary system. For a more detailed description of other primary brake constructions and reaction power cylinder constructions reference should be made to the aforesaid U.S. Patent 3,256,962, the present embodiment being shown for illustrative purposes only.

Branches 58 and 60 connect to a main conduit 62 leading to the other set of brakes by means of branch conduits 64 and 66 connected to the wheel cylinders 68 and 70 of the brakes 72 and 74, respectively, which may be conventioinal anchored brakes of the type shown in U.S. Patent 2,751,048. Thus, the wheel cylinders of the conventional brakes 72 and 74 are connected to the power cylinders 40 and 42, respectively, of the primary brakes 24 and 26 for actuation thereby.

In order to supply the secondary system with hydaulic fluid and to compensate for fluid expansion and replenishment, a branch conduit 76 connects the secondary system with the reservoir 11 of the master cylinder 10 by way of a disconnect valve 78 attached to the master cylinder 10. A by-pass conduit 80 leads directly from the valve 78 into the reservoir 11. Disconnect valve 78 is normally open, that is, when the primary system is inactive, providing unrestricted fluid communication between the reservoir 11 and the secondary system. However, when the primary system is activated by depressing foot pedal 12 the increased fluid pressure in the master cylinder 10 instantly closes valve 78 thereby disconnecting the reservoir 11 and the secondary system, thus assuring a substantially constant column of fluid within the secondary system and at the same time preventing pressure from the master cylinder being introduced into the secondary system.

For a more detailed description of the construction and functioning of the disconnect valve 78 reference should be made to co-pending application, Serial No. 580,828 filed September 26, 1966. The disconnect valve as such forms no part of the present invention other than being a part of the system in which the present invention is incorporated.

The valve assembly 82 which is provided to prevent undesirable pressure variations in the secondary system will now be described in detail.

With further reference to FIGURES 2 to 4 the valve 82 comprises a valve body 84 screwed at one end into the enlarged end of the conduit 62 and receives at its other end a nipple 86 with which the valve 82 is attached to the T-connector 65. This is illustrative only since the valve may also be a part of the T-connector 65 itself.

The valve 82 is provided at its smaller end 88 with an axial passage 90 which inwardly expands into an enlarged area 92 which receives a ball 94 for free axial movement. The enlarged area 92 further expands into a threaded bore 96 at the larger end of the valve into which the connecting nipple 86 is threaded. Thus, a continuous passage is provided through the valve by the passage 90, ball area 92 and bore 96 providing communication between the main conduit 62 and T-connector 65.

One section 98 of the area 92 immediately adjacent the passage 90 is of a diameter only slightly larger than the ball 94 so that when the ball is in that section fluid flow is restricted. When the ball 94 is in the widened section 100 fluid will pass with less restriction.

Although the ball area 92 is shown as a stepped bore having two sections 98, 100 of slightly different diameters it will be obvious that the inner diameter of the area 92 could be made tapered with the smaller end towards the passage 90 for the same purpose.

The smaller diameter section 98 of the ball area 92 is closed off towards the passage 90 by a washer 102 seated against a shoulder 106 which provides a ball stop and prevents the ball from lodging against the shoulder 106. Washer 102 is provided with triangular opposite cut-outs 104 as seen in FIGURE 3 to allow free passage of fluid therethrough.

The other end of the ball area 92 towards the threaded bore 96 is similarly closed off by another washer 108 of larger diameter which seats against a shoulder 112 in the tapered end of bore 96 and provides a stop for the ball in the other direction. Thus, the ball is free to travel axially within area 92 between the washers 102 and 108.

The larger washer 108 is also provided with opposite triangular cut-outs 110 as shown in FIGURE 4 so that fluids can pass through the ball area 92 by way of these cut-outs.

The valve 82 is assembled in the system to dispose the larger section 100 of the ball area 92 towards the wheel cylinders 68 and 70 of the conventional secondary brakes 72 and 74.

When the brakes are actuated, fluid under pressure flows from the power cylinders 40 and 42 of the primary brakes 24 and 26 through branches 58 and 60 into the main conduit 62 and displaces ball 94 against the larger washer 108 so that a less restricted flow of fluid is obtained permitting rapid application of the secondary brakes.

When the brakes are released, the fluid flows back in the opposite direction and therefore tends to displace the ball 94 towards the small diameter section 98, thereby permitting the fluid return from the wheel cylinders 68 and 70 at a more restricted rate than in the brake applying direction.

However, as explained earlier, after initial application of the primary brakes 24 and 26 the spring wind-up caused by the stopping of the vehicle causes the brake shoes of the primary brakes to rock, that is, they momentarily lose their solid seat on the brake drum which results in a sudden pressure drop in the secondary system. When this happens the brakes 72 and 74 of the secondary system will slip or lose their braking action momentarily in the absence of the resistor valve 82. The sudden pressure drop in the secondary system causes a back surge effect forcing the ball 94 to move into the small diameter section 98 of the ball area 92 thus restricting or slowing return fluid flow from the wheel cylinders 68 and 70 thereby preventing the secondary brakes from slipping or being released during this interval. After the brake shoes of the primary brakes are again firmly seated against the brake drums, normal brake application pressure derived from the power cylinders 40, 42 of the primary brakes is restored in line 62 causing the ball 94 to be moved again into the larger section 100 of the ball area 92 to restore a less restricted fluid communication with the wheel cylinders 68, 70 in the brake applying direction.

Thus, the present invention provides an effective means to restrict or prevent instantaneous pressure drop in the secondary system due to rocking in the primary brakes caused by spring wind-up during deceleration or stopping of the vehicle.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Hydraulic brake system comprising a primary brake connected to be actuated by a master cylinder in a primary hydraulic circuit, a secondary brake in an independent secondary hydraulic circuit, actuator means associated with said primary brake and responsive to the torque reaction force derived from application of said primary brake to cause fluid to flow in a first direction in said secondary circuit to apply said secondary brake, the fluid in said secondary circuit flowing in the opposite direction to release said secondary brake when said primary brake is released, and valve means in said secondary circuit for restricting the flow therethrough in both directions between said primary brake and said secondary brake to reduce pressure variations in said secondary circuit.

2. A hydraulic brake system comprising a primary brake connected to be actuated by a master cylinder in a primary hydraulic circuit, a secondary brake in a secondary hydraulic circuit, means responsive to the torque reaction force derived from actuation of said primary brake to cause fluid to flow in a first direction in said secondary system to apply said secondary brake, the fluid in said secondary circuit flowing in the opposite direction to release said secondary brake when said primary brake is released, and valve means in said secondary circuit to restrict the flow of fluid in said secondary circuit in each of said directions, the flow restriction being greater when said fluid is flowing away from said secondary brake to thereby control the rate at which the secondary brake is released when said primary brake is released.

3. A hydraulic brake system comprising a primary brake connected to be actuated by a master cylinder in a primary hydraulic circuit, a secondary brake in a secondary hydraulic circuit, means responsive to the torque reaction force derived from application of said primary brake to cause fluid to flow in a first direction in said secondary system to apply said secondary brake, the fluid in said secondary circuit flowing in the opposite direction to release said secondary brake when said primary brake is released, and flow restricting valve means in said secondary circuit comprising a valve body having a flow chamber provided with series-connected larger and smaller sections and a valve member mounted in said chamber for movement between said sections, said member being urged into said larger section by flow of fluid in said first direction to restrict the flow to a predetermined degree, and said valve member being urged into said smaller section by flow of fluid in said opposite direction to thereby restrict the flow of fluid in said opposite direction to a greater predetermined degree.

References Cited by the Examiner

UNITED STATES PATENTS

| | | | |
|---|---|---|---|
| 845,500 | 2/1907 | Wilson | 303—84 |
| 2,182,047 | 12/1939 | Eaton | 303—84 X |
| 2,269,054 | 1/1942 | Fitch | 303—84 X |
| 3,254,742 | 6/1966 | Brownyer et al. | 188—152 |

MILTON BUCHLER, *Primary Examiner.*

FERGUR S. MIDDLETON, *Examiner.*

G. E. A. HALVOSA, *Assistant Examiner.*